United States Patent
Inoue

Patent Number: 5,837,911
Date of Patent: Nov. 17, 1998

[54] ROTARY DAMPER FOR GENERATING DAMPING FORCE VARIABLE IN DEPENDENCE ON ANGULAR POSITION OF FALL BOARD OF KEYBOARD MUSICAL INSTRUMENT

[75] Inventor: Satoshi Inoue, Hamamatsu, Japan

[73] Assignee: Yamaha Corporation, Shizuoka-ken, Japan

[21] Appl. No.: 859,713

[22] Filed: May 21, 1997

[30] Foreign Application Priority Data

May 30, 1996 [JP] Japan .................................. 8-136411

[51] Int. Cl.⁶ ...................................................... G10C 3/02
[52] U.S. Cl. ............................................................ 84/179
[58] Field of Search ........................... 84/178, 179, 423 R

[56] References Cited

U.S. PATENT DOCUMENTS 5,056,396 10/1991 Furukawa .................................... 84/179

FOREIGN PATENT DOCUMENTS

5-48238 12/1993 Japan .

Primary Examiner—Cassandra C. Spyrou
Assistant Examiner—Shih-yung Hsieh
Attorney, Agent, or Firm—Hazel & Thomas, PC

[57] ABSTRACT

A damper assembly is provided between a side arm of an upright piano and a fall board for preventing the fall board from violent collision with a key slip, the damper assembly includes a rotary damper embedded into the fall board and producing small damping force during a rotation of the fall board from the closed position and a vertical position and large damping force during a rotation of the fall board from the vertical position to the closed position, a turnable plate member turnably connected to the side arm and not allowing the shaft member to turn with respect thereto, a stopper held in contact with the turnable plate member between the vertical position and the closed position and a spring generating resilient force larger than the small damping force and smaller than the large damping force so as to allow the turnable plate member to turn together with the rotary damper between the vertical position and an open position, and the damper assembly allows a player to move the fall board without large force.

7 Claims, 5 Drawing Sheets

ROTARY DAMPER FOR GENERATING DAMPING FORCE VARIABLE IN DEPENDENCE ON ANGULAR POSITION OF FALL BOARD OF KEYBOARD MUSICAL INSTRUMENT

FIELD OF THE INVENTION

This invention relates to a rotary damper and, more particularly, to a rotary damper for generating a damping force variable in dependence on angular position of a fall board of a keyboard musical instrument such as a piano.

DESCRIPTION OF THE RELATED ART

A keyboard musical instrument such as an acoustic piano or an electronic piano has a keyboard exposed to a player, and the player selectively fingers a score on the keyboard. However, the keyboard is usually covered with a suitable covering plate after the playing, and a fall board is a typical example of the covering plate. In the following description, term "closed position" means a position where the keyboard is covered with the fall board. On the other hand, "open position" means a position where the key board is exposed to a player. When the center of gravity of the fall board reaches a vertical plane usually normal to the keyboard, the fall board reaches "vertical position".

The fall board of an acoustic piano is turnable with respect to side arms provided on both sides of the keyboard, and, accordingly, is long and heavy. While the fall board is staying in the open position, it reclines on a front board of the acoustic piano. When the player draws the leading end of the fall board nearer, the fall board turns, and the keyboard is covered with the fall board. While the fall board is turning toward the keyboard, the player needs to support the weight after the vertical position so as to prevent the fall board from collision with the key blocks. If the fall board slips out of player's fingers, the fall board is violently brought into collision, and, sometimes, the fingers are hurt.

In order to prevent the fall board from the undesirable collision, a damper is usually inserted between the side arms and the fall board. For example, a rotary damper is disclosed in Japanese Utility Model Publication of Unexamined Application No. 5-48238. Oil is sealed in a stationary casing of the rotary damper. While a player is lifting the fall board from the closed position to the open position, the oil merely provides small viscous resistance, and allows the player to smoothly move the fall board. On the other hand, when the fall board is moved from the open position to the closed position, the prior art rotary damper provides large viscous resistance against the rotation of the fall board.

The prior art rotary damper encounters a problem in that a player feels the fall board too heavy during the closed position and the vertical position. The angle between the closed position and the open position is different between the piano models. A fall board incorporated in an upright piano of a manufacturer is moved over 120 degrees to 130 degrees, and a fall board of a grand piano of the same manufacturer is moved over 90 degrees. In the grand piano, the open position is substantially matched with the vertical position, and the prior art rotary damper immediately decelerates the fall board against the gravity after leaving from the open position. The player does not need to strongly support the fall board, and feels it grateful. However, if the prior art rotary damper is installed in the upright piano, the player needs to strongly draw the fall board nearer, and the prior art rotary damper provides the large damping force against player's fingers. Of course, when the fall board passes through the vertical position, the large damping force decelerates the fall board against the gravity, and the player also feels it grateful. On the other hand, when the player moves the fall board from the closed position to the open position, the prior art rotary damper can not provide a sufficient damping force against the fall board after the vertical position, and the fall board is liable to be violently brought into collision with the front board. Thus, the prior art rotary damper is not always grateful.

SUMMARY OF THE INVENTION

It is therefore an important object of the present invention to provide a damper which provides a damping force variable depending upon the angular position of a fall board.

To accomplish the object, the present invention proposes to stop a relative motion of a movable member and a stationary member between a vertical position and an open position.

In accordance with the present invention, there is provided a damper provided between a case structure of a musical instrument with an opening and a fall board turnable between a closed position for covering the opening and an open position for exposing the opening to a person, comprising: a damper unit having a first member turnable together the fall board and a second member, and generating a small damping force through a first relative motion between the first member and the second member in a first direction, a negligible damping force between the intermediate portion and the open position without a relative motion and a large damping force through a second relative motion between the first member and the second member in a second direction opposite to the first direction; and a change-over mechanism provided between the case structure and the first member, and causing the damper unit to take the first relative motion from the closed position to the intermediate position and the second relative motion from the intermediate position to the closed position and to stop the relative motion between the intermediate position and the open position.

BRIEF DESCRIPTION OF THE DRAWINGS

The features and advantages of the rotary damper according to the present invention will be more clearly understood from the following description taken in conjunction with the accompanying drawings in which.

DESCRIPTION OF THE PREFERRED EMBODIMENTS

First Embodiment

Figure 1:
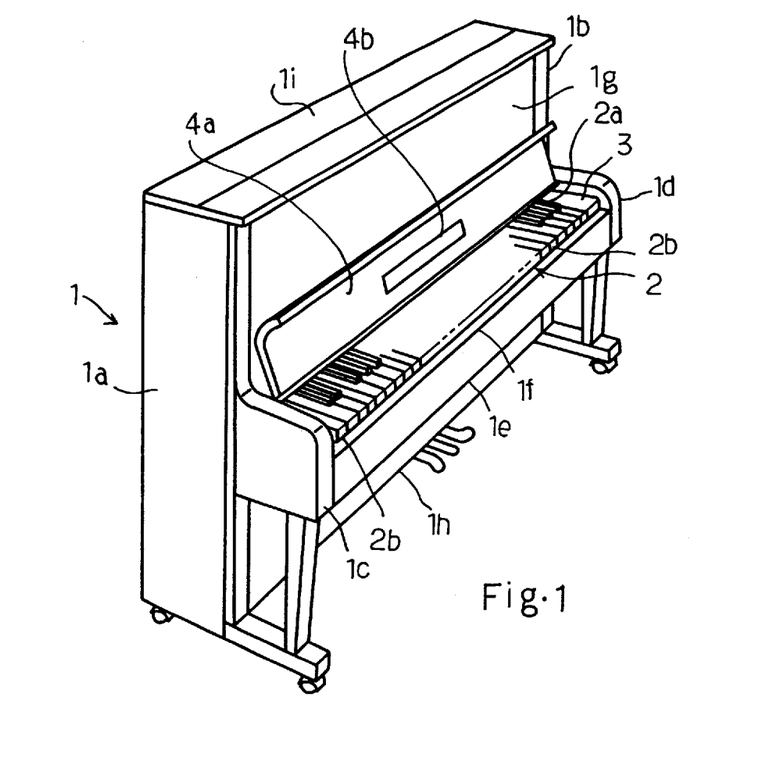
FIG. 1 is a perspective view showing an upright piano equipped with a damper assembly according to the present invention.

Referring to FIG. 1 of the drawings, an upright piano comprises a piano case 1, and a pair of side boards 1a/1b, a pair of side arms 1c/1d, a key bed 1e, a key slip 1f, an upper front board 1g, a lower front board 1h, a top board 1i and a bottom board (not shown) form parts of the piano case. The top board 1i, the upper/lower front boards 1g/1h and the bottom board laterally extend between the side boards 1a and 1b, and the side arms 1c/1d project from the side boards 1a/1b, respectively. The key bed 1e also projects from the pair of side boards 1a/1b, and bridges a gap between the side arms 1c/1d. The key slip 1f is attached to the front end portion of the key bed 1e, and extends between the side arms 1c and 1d.

The upright piano further comprises a keyboard 2 and a pair of key blocks 3. A plurality of black keys 2a and a plurality of white keys 2b form in combination the keyboard 2. In this instance, eighty-eight black and white keys 2a/2b are incorporated in the keyboard 2. The keyboard 2 is mounted on the key bed 1e, and the key blocks 3 are placed between the side arms 1c/1d and the keyboard 2. Though not shown in FIG. 1, a plurality of key action mechanisms, a plurality of hammer assemblies, a plurality of damper mechanisms and a plurality of sets of strings are provided inside of the piano case 1. The key action mechanisms, the hammer assemblies and the damper mechanisms cooperate with the black and white keys 2a/2b, and produce acoustic piano tones through the vibrations of the strings as well known to a person skilled in the art.

Figure 2:
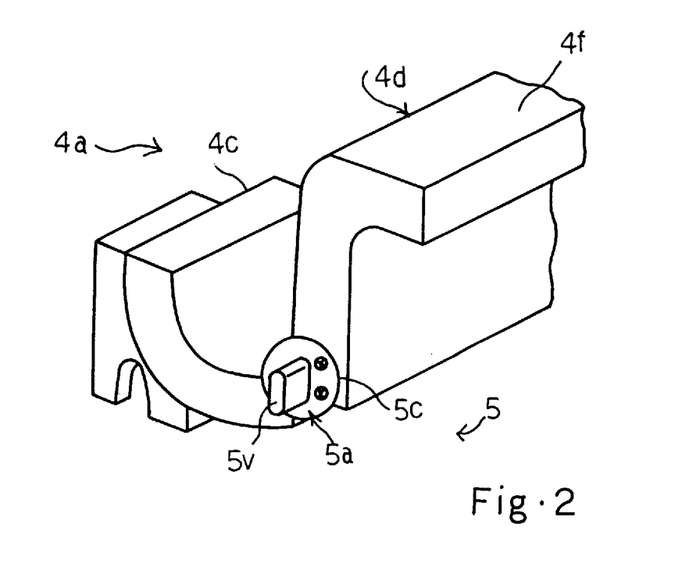
FIG. 2 is a perspective view showing a rotary damper incorporated in the damper assembly.

The upright piano further comprises a fall board 4a, and a music rack 4b is attached to an inner surface of the fall board 4b. As will be shown in FIG. 2, the fall board is split into a rear board 4c and a front lid 4d, and the rear board 4c is connected through a hinge (not shown) to the front lid 4d. The rear board 4c is fixed to parts of the piano case 1 such as the side arms 1c/1d, and is stationary to the piano case 1. On the other hand, the front lid 4d is turnable between the closed position CP and the open position OP. The leading end 4f of the front lid 4d is in contact with the key slip 1f during the closed position, and turns over 130 degrees. When the front lid 4d reaches the open position, the leading end portion 4f is brought into contact with the upper front board 1g. The front lid 4d reclines on the upper front board 1g in the open position, and is supported by the upper front board 1g.

The upright piano further comprises a pair of damper assemblies 5 connected between the side arms 1c/1d and the front lid 4d, and the pair of damper assemblies 5 provides suitable damping force to the front lid 4d during a turning motion between the closed position and the open position. The damper assemblies 5 are similar in structure to each other, and only one of the damper assemblies 5 is hereinbelow described in detail.

The damper assembly 5 includes a rotary damper 5a attached to the front lid 4d and an absorber 5b attached to the side arm 1c, and the rotary damper 5a and the absorber 5b are engaged with each other so as to generate damping force variable depending upon the angular position of the front lid 4d.

As shown in FIGS. 4A to 4D, the rotary damper 5a includes a cylindrical case 5c and a shaft member 5d inserted into the cylindrical case 5c. The cylindrical case 5c is embedded into the front lid 4d, and is fixed thereto. The cylindrical case 5c is located as close to the hinge as possible. The shaft member 5d is rotatable in the cylindrical case 5d, and a v-letter shaped groove 5e is formed in the shaft member 5d. The v-letter shaped groove 5e is defined by side walls 5f/5g and a bottom surface 5h, and is elongated along a center axis CL1 of the shaft member 5d.

The rotary damper 5a further includes a partition wall 5i inwardly projecting from the cylindrical case 5c, and the partition wall 5i splits the v-letter shaped groove 5e into two chambers 5j/5k. The volumes of the two chambers 5j/5k are variable depending upon the relative position between the cylindrical case 5c and the shaft member 5d.

The rotary damper 5a further includes incompressible fluid such as damping oil 5m filling the chambers 5j/5k. A through hole 5n is formed in the partition wall 5i, and is open to both chambers 5j/5k. A check valve 5p is provided on the partition wall 5i, and allows the damping oil 5m to flow from the chamber 5j into the other chamber 5k. The partition wall 5i is slightly spaced from the bottom surface 5h, and a throttle 5q is formed between the partition wall 5i and the bottom surface 5h. The damping oil 5m flows between the chambers 5j and 5k through the throttle 5q. The through-hole 5n is much larger in cross area than the throttle 5q, and provides small viscous resistance against the damping oil 5m flowing therethrough. On the other hand, the throttle 5q provides large viscous resistance against the damping oil 5m flowing therethrough. For this reason, when the damping oil 5m flows from the chamber 5j to the other chamber 5k, most of the damping oil 5m passes through the through-hole 5n. However, when the damping oil 5m flows vice versa, the check valve 5p closes the through-hole 5n, and the shaft member 5d forces the damping oil 5m to flow through the throttle 5q.

Figure 3:
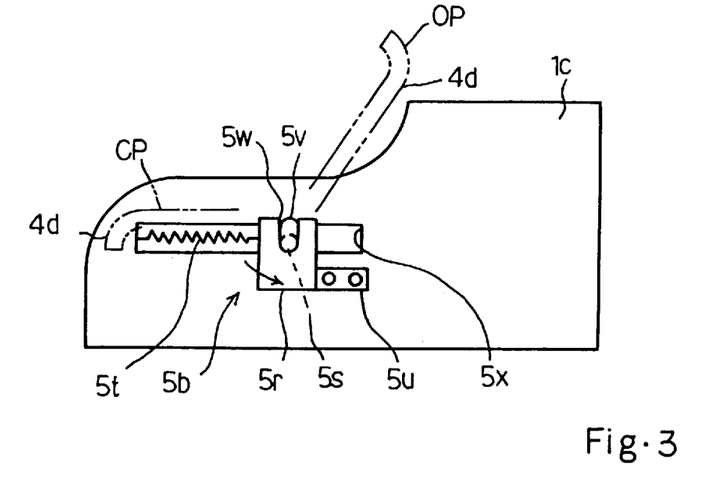
FIG. 3 is a side view showing an absorber incorporated in the damper assembly.

The absorber 5b includes a plate member 5r turnably supported by the side arm 1c by means of a pin member 5s, a spring 5t stretched between the plate member 5r and the side arm 1c and a stopper 5u attached to the plate member 5r. The shaft member 5d has an elliptical end portion 5v, and the elliptical end portion 5v projects from the cylindrical case 5c. A u-letter shaped aperture 5w is formed in the plate member 5r, and has a width roughly equal to the minor axis of the elliptical cross section of the projection 5v. For this reason, the elliptical projection 5v is received into the u-letter shaped aperture 5w, and is allowed to be moved in the direction of the depth of the u-letter shaped aperture 5w.

A groove 5x is formed in the side arm 1c, and is open to the inside of the piano case 1, and the spring 5t is accommodated in the groove 5x. The spring 5t exerts resilient force on the plate member 5r, and the resilient force is larger in magnitude than the damping force produced by the damping oil 5m passing through the through hole 5n. When the front lid 4d is resting in the closed position CP, the spring 5t forces the plate member 5r to be held in contact with the stopper 5u.

Figure 4A:
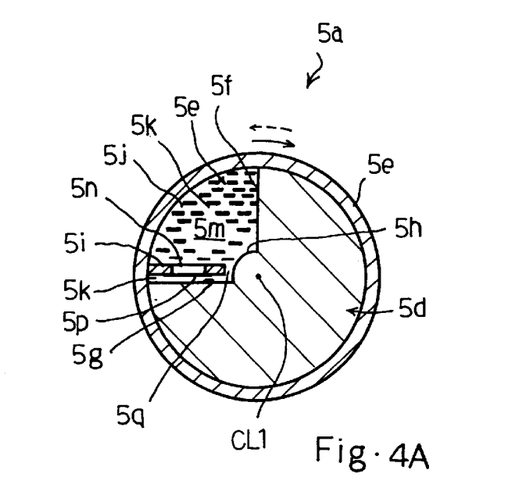
FIGS. 4A to 4D are cross sectional views showing variation of relative position between a closed position and an open position.

Assuming now that the front lid 4d is in the closed position CP, the cylindrical case 5c minimizes the chamber 5k, and most of the damping oil 5m is staying in the other chamber 5j as shown in FIG. 4A. The plate member 5r is pressed against the stopper 5u as shown in FIG. 3.

Figure 4B:
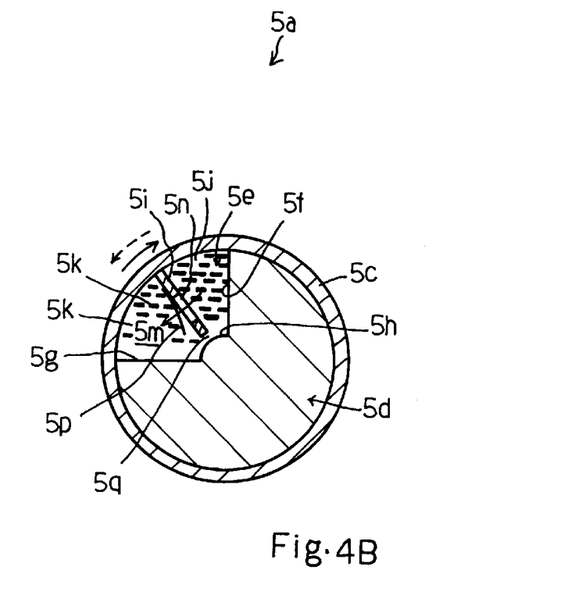

A player lifts the leading end portion 4f of the front lid 4d, and the front lid 4d and the cylindrical case 5c turn in the clockwise direction around the hinge (not shown). The turning motion of the cylindrical case 5c increases the volume of the chamber 5k, and makes the chamber 5k vacuum. For this reason, the damping oil 5m flows through the through hole 5n into the chamber 5k. The damping force is so small that the player feels the front lid 4d light. As described hereinbefore, the resilient force of the spring 5t is larger than the damping force, and the plate member 5r and, accordingly, the shaft member 5d never turn around the pin member 5s as shown in FIG. 4B.

Figure 4C:
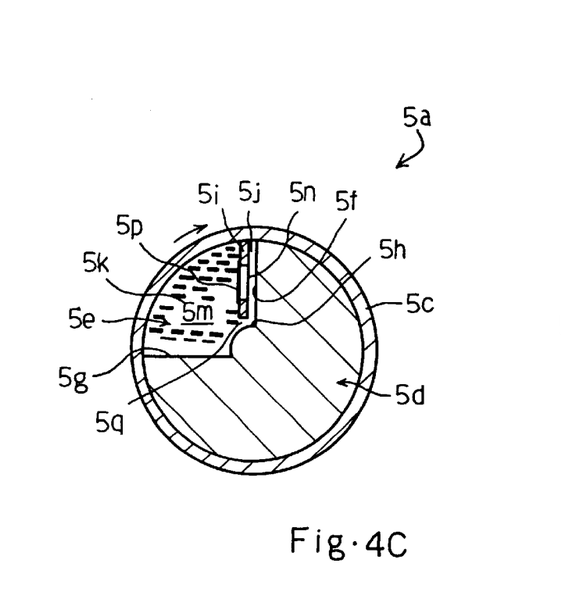

When the front lid 4d becomes vertical, the partition wall 5i arrives at the closest position to the vertical wall 5f, and the chamber 5j is minimized as shown in FIG. 4C. The front lid 4d further turns toward the open position OP over the vertical position. The relative position between the cylindrical case 5c and the shaft member 5d is not changed (compare FIG. 4C with FIG. 4D), and the plate member 5r turns around the pin member 5s in the clockwise direction, because the viscous resistance or the damping force is larger than the resilient force of the spring 5t. However, the resilient force is larger than the viscous resistance between the closed position and the vertical position, and the resilient force prevents the front lid 4d from violent collision with the upper front board 1g. When the front lid 4d reaches the open position OP, the cylindrical case 5c and the shaft member 5d enters into the position shown in FIG. 4D.

Figure 4D:
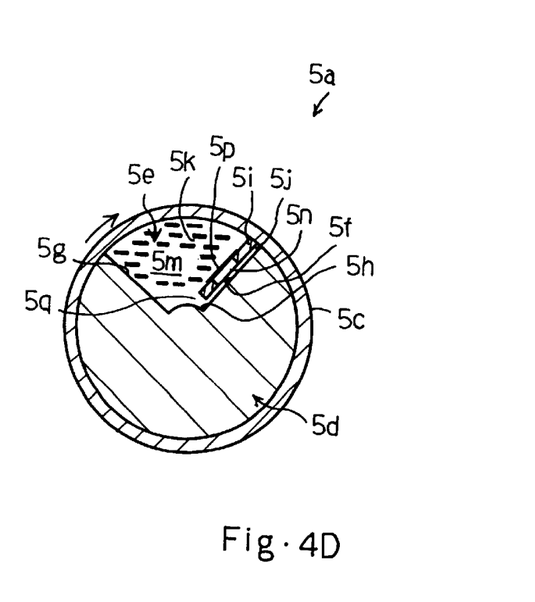

On the other hand, while the player is moving the front lid 4d from the open position toward the vertical position, the cylindrical case 5c turns in the counter clockwise direction, and the spring 5t causes the plate member 5r to turn in the counter clockwise direction together with the shaft member 5d. The relative position between the cylindrical case 5c and the shaft member 5d is not changed, and the damper assembly 5 does not provide a substantial damping force. For this reason, the player easily draws the front lid 4d nearer.

When the front lid 4d reaches the vertical position, the rotary damper 5a returns to the position shown in FIG. 4C, and the plate member 5r is brought into contact with the stopper 5u. As a result, the shaft member 5d is not allowed to turn. While the front lid 4d is turning from the vertical position toward the closed position CP, the cylindrical case 5c turns in the counter clockwise direction, and makes the chamber 5j vacuum. The damping oil 5m flows from the chamber 5k to the other chamber 5j. The check valve 5p closes the through hole 5n, and the damping oil 5m passes through the throttle 5q. The damping oil 5m encounters the large viscous resistance, and the rotary damper 5a generates large damping force against the tuning motion of the front lid 4d. Thus, the damper assembly 5 prevents the front lid 4d from violent collision with the key slip 1f without a strong support by the player.

As will be appreciated from the foregoing description, the damper assembly 5 changes the damping force depending upon the angular position of the fall board 4, and the player feels the damper assembly 5 grateful at all times.

Second Embodiment

Turning to FIGS. 5 to 8 of the drawings, another damper assembly 15 is provided for a fall board 16. The fall board 16 is split into a rear board 16a and a front lid 16b, and the rear board 16a is connected to the front lid 16b by means of a hinge 16c.

Figure 5:
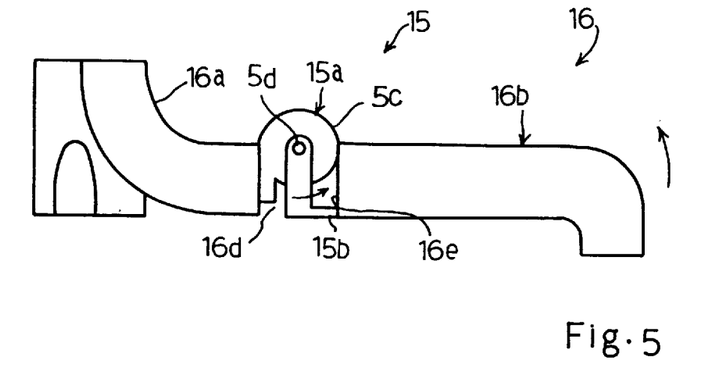
FIG. 5 is a side view showing another damper assembly according to the present invention.

The damper assembly 15 includes a rotary damper 15a, a connecting plate 15b and a torsion spring 15c. The rotary damper 15a is similar to the rotary damper 5a, and, for this reason, components of the rotary damper 15b are labeled with the same references as those of the rotary damper 5a without detailed description.

Figure 6:
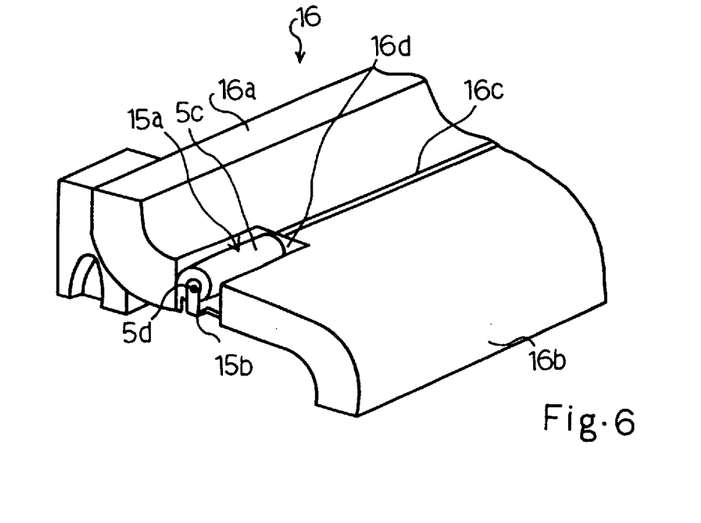
FIG. 6 is a perspective view showing a rotary damper assembled with a fall board.
Figure 7:
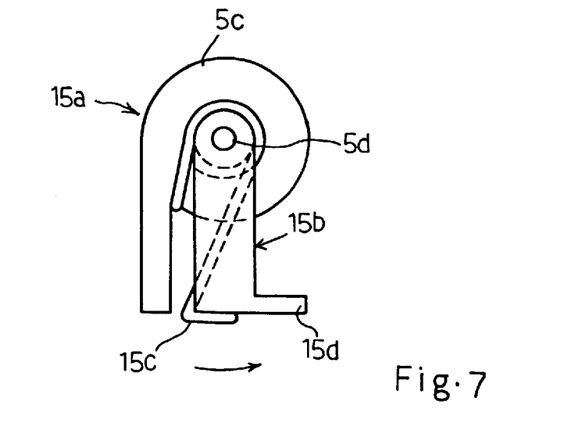
FIG. 7 is a perspective view showing the damper assembly.
Figure 8:
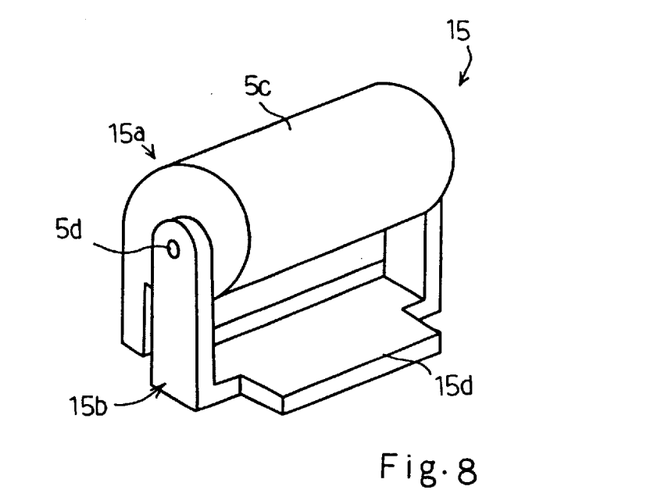
FIG. 8 is a perspective view showing the damper assembly.

The rear board 16a and the front lid 16b are partially cut away as shown in FIG. 6, and the damper assembly 15 is accommodated in the hollow space in such a manner that the shaft member 5d is aligned with the hinge 16c. The connecting plate 15b is fixed at one end thereof to the shaft member 15b. The connecting plate 15b has a contact portion 15d at the other end thereof, and the torsion spring 15c is engaged with the connecting plate 15b (see FIG. 7) so as to urge the connecting plate 15b to turn in the counter clockwise direction. As a result, the contact portion 15d is pressed against the rear surface 16e of the front lid 16b.

In this instance, the connecting plate 15b, the contact portion 15d and the torsion spring 15c are corresponding to the plate member 5r, the stopper 5u and the spring 5t, respectively.

Figure 9A:
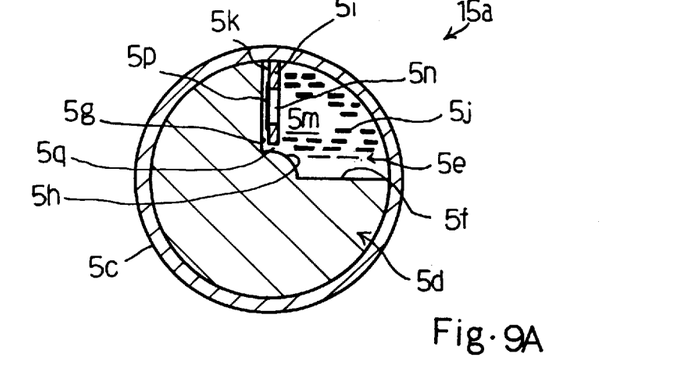
FIGS. 9A to 9C are cross sectional views showing variation of relative position between a closed position and a vertical position.
Figure 9B:
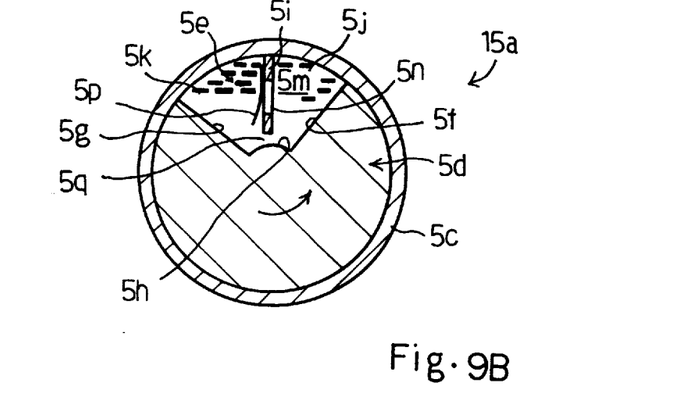

Subsequently, description is made on the behavior of the damper assembly 15 with reference to FIGS. 9A to 9C. When the front lid 16b is staying in the closed position, the cylindrical case 5c causes the partition wall 5i as close to the vertical wall 5g as possible as shown in FIG. 9A.

While a player lifts the front lid 16b, the front lid 16b firstly turns from the closed position toward the vertical position, and the torsion spring 15c urges the connecting plate 15b and the shaft member 5d to turn in the counter clockwise direction together with the front lid 16b. The check valve 5p allows the damping oil 5m to flow into the chamber 5k through the through-hole 5n as shown in FIG. 9B. The damping oil 5m passing through the through-hole 5n encounters small viscous resistance, and the damper assembly 15 merely generates small damping force against the turning motion of the front lid 16b. For this reason, the player feels the front lid 16b light. When the front lid 16b reaches the vertical position, the cylindrical case 5c and the shaft member 5d change the relative position as shown in FIG. 9C, and the partition wall 5i becomes as close to the vertical surface 5f as possible. For this reason, the front lid 16b is allowed to be spaced from the contact portion 15d, and the cylindrical case 5c and the shaft member 5d keeps the relative position therebetween after the vertical position.

While the front lid 16b is turning from the vertical position to the open position, the damper assembly 15 does not generate any damping force, and the front lid 16b is brought into contact with the upper front board. When the front lid 16b reclines on the upper front board, the cylindrical case 5c and the shaft member 5d keeps the relative position shown in FIG. 9C.

Figure 9C:
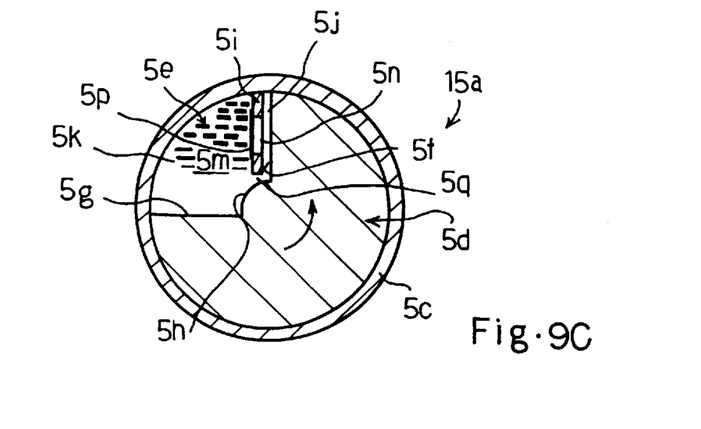

On the other hand, when the player draws the front lid 16b nearer so as to cover the keyboard with the front lid 16b, the cylindrical case 5c and the shaft member 5d keep the relative position shown in FIG. 9c during the turning motion from the open position to the vertical position, and the front lid 16b does not encounter a damping force. While the front lid 16b is turning from the vertical position to the closed position, the check valve 5p closes the through-hole 5n, and the damping oil 5m flows from the chamber 5k through the throttle 5q into the other chamber 5j. The damping oil 5m encounters large viscous resistance, and the damper assembly 15 generates large damping force. For this reason, even if the player does not strongly support the front lid 16b, the front lid 16b gently lands on the key slip.

The damper assembly 15 achieves all the advantages of the first embodiment.

Third Embodiment

Figure 10:
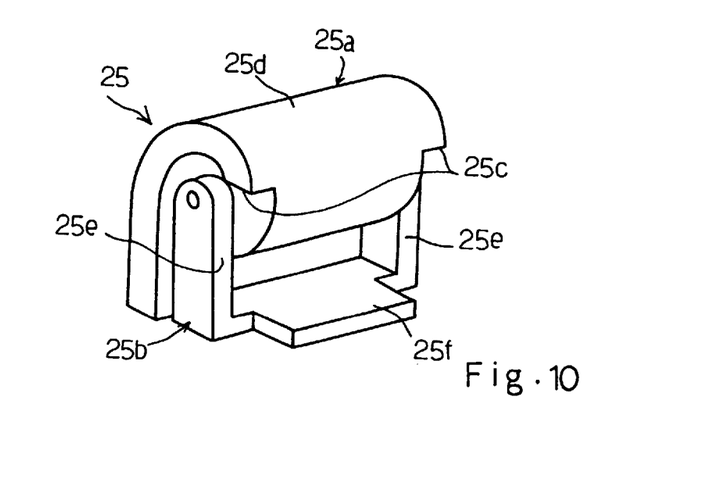
FIG. 10 is a perspective view showing yet another damper assembly according to the present invention.

FIG. 10 illustrates yet another damper assembly 25 embodying the present invention. The damper assembly 25 also comprises a rotary damper 25a, a connecting member 25b and a torsion spring (not shown). The rotary damper 25a is similar to the rotary damper 15a except for steps 25c formed in the cylindrical case 25d. When a fall board associated therewith reaches the vertical position, the steps 25c are brought into contact with contact portions 25e of the connecting member 25b, and allows the fall board to be spaced from the contact portion 25f of the connecting member 25b.

The damper assembly 25 achieves all the advantages of the first embodiment.

Although particular embodiments of the present invention have been shown and described, it will be obvious to those skilled in the art that various changes and modifications may be made without departing from the spirit and scope of the present invention.

For example, a fall board may be supported by a pair of rotary dampers without a hinge.

A fall board may be associated with only one damping assemblies inserted between one side surface of the fall board and a side arm.

If the fall board is light, the air may flow between the chambers of the rotary/linear damper.

A compression spring or any elastic member is available for the damper assembly instead of the springs 5t and 15c.

What is claimed is:

1. A damper for a musical instrument, said instrument having a case structure and a fall board, the fall board rotatable in a first direction between a closed position and an open position and a second direction between the open position to the closed position, an intermediate position being located between said closed and open positions, said damper comprising:

a damper means connected to said fall board, for providing a first damping force as said fall board rotates in the first direction and a second damping force as the fall board rotates in the second direction opposite to said first direction, said first damping force being smaller than said second damping force, said damper means further including a first member and a second member, said first member being rotatably mounted relative to said second member; and a change over means mounted to said case structure and to said damper means for permitting rotation between the first and second members of the damper means as said fall board travels between the closed position to the intermediate position in said first direction thereby providing said first damping force, and for permitting rotation between the first and second members of the damper means as said fall board travels between the intermediate position and the closed position in said second direction thereby providing said second damping force, and for locking said first and second members relative to each other between said intermediate position and said open position in both said first and second directions and causing said damper means to rotate relative to said change-over means thereby providing a third damping force, wherein said third damping force is larger than said first damping force and smaller than said second damping force.

2. The damper as set forth in claim 1, wherein said damper means includes a case member serving as said first member and having a hollow space inside thereof, a shaft member serving as said second member, connected to said change-over means, accommodated in said hollow space and defining a first chamber and a second chamber together with said case member, a fluid filling said first chamber and said second chamber, and a flow resistance controller provided between said first chamber and said second chamber and providing said first damping force against said fluid flowing from said first chamber to said second chamber during rotation in said first direction and said second damping force against said fluid flowing from said second chamber to said first chamber during rotation in said second direction.

3. The damper as set forth in claim 2, in which said flow resistance controller has a partition wall member fixed to said case member and having a through hole open to said first chamber and said second chamber, a check valve attached to said partition wall member and closing said through hole when said fluid flows from said second chamber to said first chamber, and a throttle defining between said partition wall and said shaft member and allowing said fluid to flow between said first chamber and said second chamber.

4. The damper as set froth in claim 2, wherein the rotating axis of said shaft member is deviated from the rotating axis of said fall board, and said changer-over means includes a connecting member turnably connected to said case structure and having an elongated hole allowing said shaft member to be moved therealong during a turning motion of said fall board, a resilient member urging said connecting member in a direction to move said fall board toward said closed position and exerting said third damping force on said connecting member so that said connecting member turns together with said shaft member during a turning motion between said intermediate position and said open position, and a stopper attached to said case structure and stopping said connecting member during a turning motion between said closed position and said intermediate position by means of said resilient member.

5. The damper as set forth in claim 1, wherein said damper unit includes a case member serving as said second member, connected to said case structure and having a hollow space inside thereof, a rotatable shaft member serving as said first member, pressed against said fall board by means of said change-over means, accommodated in said hollow space and defining a first chamber and a second chamber together with said case member, a fluid filling said first chamber and said second chamber, and a flow resistance controller provided between said first chamber and said second chamber and providing said first damping force against said fluid flowing from said first chamber to said second chamber during rotation in said first direction and said second damping force against said fluid flowing from said second chamber to said first chamber during rotation in said second direction.

6. The damper as set forth in claim 5, wherein said rotatable shaft member is aligned with the rotating axis of said fall board, and said changer-over means includes a contact member attached to said rotatable shaft member so as to turn together therewith and having a contact portion, a resilient member generating said third damping force and urging said contact member together with said fall board from said closed position toward said open position so that said contact portion is held in contact with said fall board during a turning motion from said closed position to said intermediate position, said fall board being spaced from said contact member during a turning motion between said intermediate position and said open position.

7. The damper as set forth in claim 6, in which changeover means further includes a stopper so as to prevent said case member and said rotatable shaft member from the relative motion between said intermediate position and said open position.

* * * * *